July 30, 1968   J. E. JORDAN   3,395,383
PULSE CIRCUIT AND RELEASABLE CONDUCTOR CONNECTOR THEREFOR
Filed Dec. 13, 1967
FIG_1_
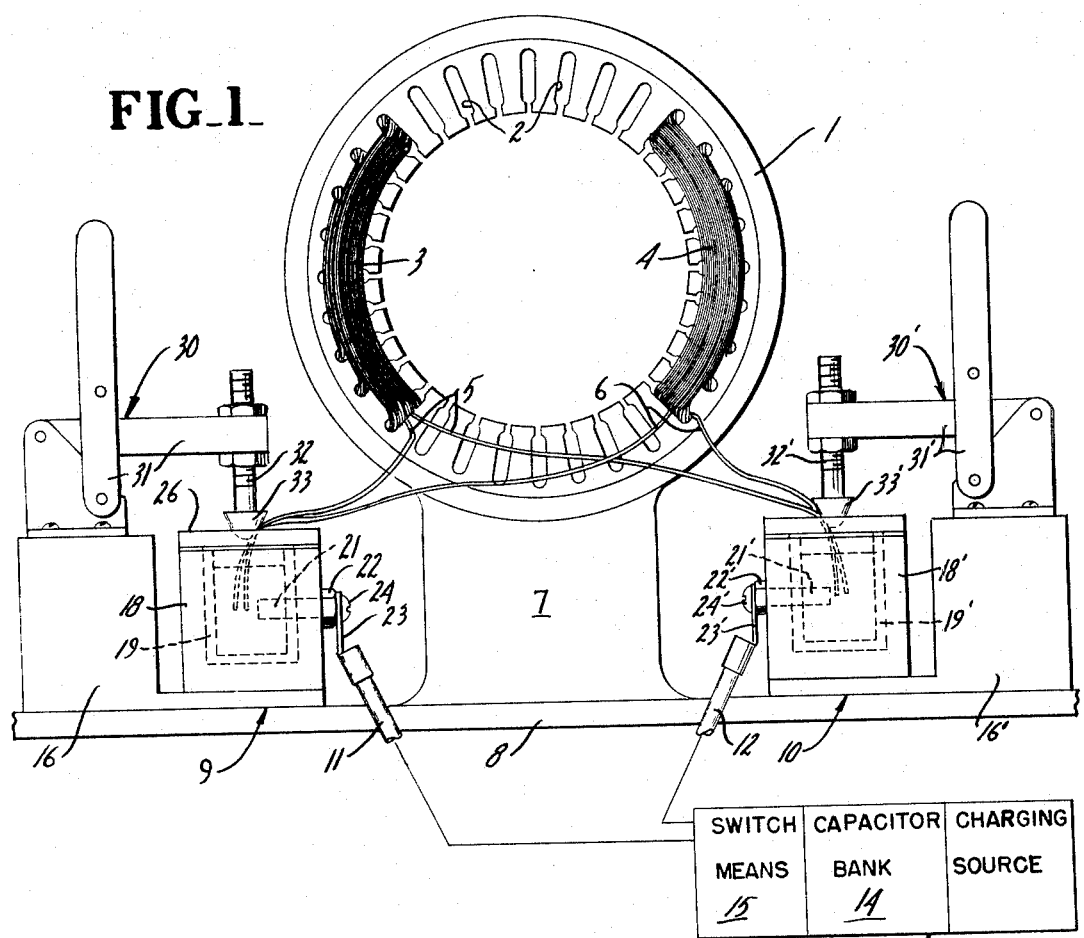
FIG_2_
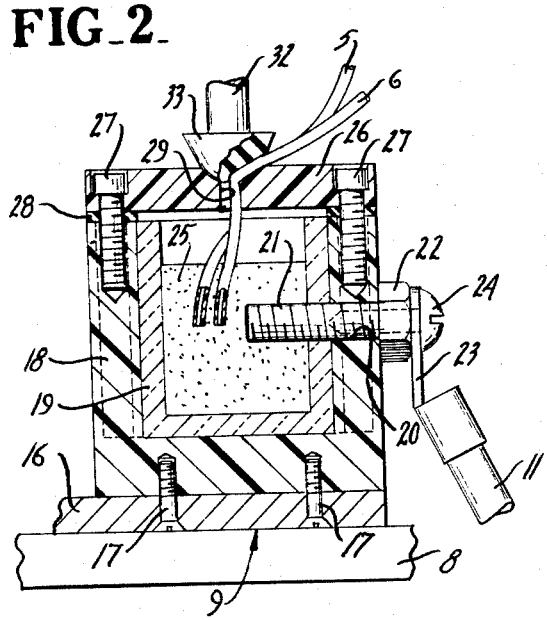
FIG_3_
INVENTOR.
JOHN E. JORDAN
BY
Andrus & Starke
Attorneys United States Patent Office 3,395,383
Patented July 30, 1968

3,395,383
PULSE CIRCUIT AND RELEASABLE CONDUCTOR CONNECTOR THEREFOR
John E. Jordan, Troy, Ohio, assignor to A. O. Smith Corporation, Milwaukee, Wis., a corporation of New York
Filed Dec. 13, 1967, Ser. No. 690,123
5 Claims. (Cl. 339—118)

ABSTRACT OF THE DISCLOSURE

A releasable connector interconnects an output power source lead to an insulated motor winding lead. An outer cup-shaped nylon housing is lined with a ceramic cup-shaped and partially filled with a highly conductive calcined coke which will pass a number 16 mesh sieve but not a number 32 mesh sieve. The top of the housing is sealed with a removable upper wall having a central opening through which the motor winding insulated leads are inserted into the coke. An insulating clamp closes the opening and holds the leads positioned within the coke. A power contact bolt extends through an appropriate side wall opening into a calcined coke. The energy power source includes a bank of capacitors connected to the contact bolts of a pair of connectors through a switch. When the switch closes, a short duration, high energy pulse flows through the motor winding.

---

This invention relates to a pulse circuit and a releasable connector for interconnecting of a circuit conductor in such circuit.

In certain applications high current pulses are applied to a load. For example, the winding in the stator of an electric motor can be conveniently positioned or compressed within the stator slots by the application of very high power, short duration pulses of electrical energy into the winding. In passing through the stator winding, the current induces a field in the stator windings or an adjacent member with the magnetic interaction causing the winding to move into the stator slots, such as discussed in U.S. Patents 3,333,328 and 3,333,329. Generally, the power supply for this and similar applications employ a bank of capacitors as the power source which provide a large current for a short duration.

The capacitor bank is normally charged to a voltage of the order 2000 to 4000 volts depending on the size of the capacitor bank. The relatively low resistance of the stator winding results in the large current supplied to the stator winding. Although this system has been found to provide a highly satisfactory means of positioning the stator windings, an interconnection of the stator winding leads to the pulse source to carry such currents creates a severe practical problem particularly for mass production lines.

In prior art, the small diameter stator leads are connected to the power source by a suitable mechanical contact or connector assemblies. The high energy pulses have been found to burn the mechanical connectors and thus present substantial practical problems to commercial and economic application of the high energy pulsing system.

The present invention is particularly directed to such a pulse circuit and more particularly to a reliable and long life releasable connector for interconnecting of the output power source to relatively small load lead.

Generally, in accordance with the present invention, an enclosure is provided containing a generally fluid-like conducting medium which readily conforms to any lead inserted in the medium. A high energy power source is interconnected to a conducting member which is in intimate contact with the conducting medium. The enclosure or housing includes an opening through which the lead or leads are inserted into the fluid-like medium. The insulated load leads may in accordance with one aspect of the present invention be inserted into the fluid-like medium without removal of the insulation other than the exposed tip or cut end. During the short duration, high energy pulse part of the lead insulation is disrupted and burned away. The lead opening is preferably closed to hold the lead within the housing and to contain the fluid-like medium against the explosive forces of the power surge. The conducting medium should retain its physical characteristic when subjected to the high energy pulses and in particular should have a very low oxidizing potential, a very high melting or vaporizing point, and an extremely good electrical conductivity. Generally, when employing a power level of the order encountered in the magnetic positioning of stator windings, applicant has found that calcined coke which passes a number 16 sieve but not a number 32 sieve provides outstanding results.

More particularly, in accordance with a particular aspect of the present invention which has been found to provide highly satisfactory results, the enclosure includes an outer cup-shaped plastic housing. The housing is lined with a high temperature protective material and is partially filled with a calcined coke. The top of the housing is sealed with a removable upper wall having an opening through which the leads are inserted into the coke. An insulating clamp member closes the opening and holds the leads positioned within the coke. The power contact member extends through an appropriate side wall opening into the calcined coke.

The drawing furnished herewith illustrates a preferred construction of the present invention in which the above advantages and features are disclosed as well as others which will be clear from the following description.

In the drawing:

FIG. 1 is a diagrammatic side elevational view of an assembly employing contacts or connectors constructed in accordance with the present invention for interconnecting of stator winding leads to a high energy pulse source;

FIG. 2 is an enlarged vertical cross section through one of the connectors shown in FIG. 1; and FIG. 3 is a plan view of the connector shown in FIG. 2 with the left side broken away to show slots for cooling.

Referring to the drawing and particularly to FIG. 1, the present invention is shown in a system for positioning of stator windings. An annular laminated stator core 1 of known construction includes a plurality of circumferentially distributed internal slots 2 within which a stator winding assembly is wound. The illustrated stator winding assembly includes a pair of diametrically located windings 3 and 4, each of which includes a plurality of coils wound of relatively fine wire and connected in series. Winding 3 includes a pair of leads 5 and winding 4 includes a pair of leads 6. The stator core 1 is assembled with the windings wound within the slots 2 and mounted within a suitable support fixture 7 on a table 8. A pair of similar contact or connector assemblies 9 and 10 is provided. Each assembly 9 and 10 is connected to one of a pair of power leads 11 and 12 from a pulse power source 13 and is adapted to receive one of the leads of the pair of leads 5 and 6 to simultaneously connect the windings 3 and 4 in parallel to the power source 13.

Although power source 13 may be of any suitable variety, it is diagrammatically shown including a capacitor tank 14 connected to a suitable D.C. charging source. The capacitor bank 14 is connected by a suitable switching means 15 to the power leads 11 and 12 for discharging of the stored energy into the stator windings. Although any high energy source can be employed, the capacitor discharge system has been found to provide a highly efficient and reliable power supply. Alternating current power may be, for example, directly applied to the windings through the connectors 9 and 10 but would result in substantial heating losses and require more power.

The connector assemblies 9 and 10 are essentially identical in construction and consequently the connector assembly 9 is described in detail, with corresponding elements of the connector assembly 10 identified by similar primed numbers.

The illustrated connector assembly 9 includes an insulating base member 16 which is generally L-shaped with one leg secured to the table 7 by a plurality of mounting screws 17 and with an upstanding leg portion. A cup-shaped open topped housing 18 having a generally circular cross section is secured within the notched or recessed portion of the base member 16 and in slightly spaced relation to the upstanding leg portion. The housing 18 is formed of a suitable electrically insulating material such as that sold under the tradename nylon. A heat protective liner 19 is secured within the housing 18. The illustrated liner 19 is a preformed ceramic cup-shaped member essentially lining the bottom and side wall of the housing. The liner 19 may be any suitable high temperature material which shields the outer housing from the effects of the heat generated during the transfer of power from the power source to the winding leads 5 and 6. Applicant has found that a ceramic material sold under the trademark "Heanium" provides highly satisfactory results.

The side wall of the housing 18 is provided with a threaded opening 20 through which a contact bolt 21 is secured with the inner end extending inwardly into the center of the housing. The contact bolt 21 includes an outer head 22 to which a load terminal 23 is secured by a clamping screw 24 or the like.

In accordance with the present invention, the housing is substantially filled through the upper end with a highly conductive fluid-like material 25 which will readily permit insertion of the thin, flexible winding leads 5 and 6. The material may be finely divided solid medium, a liquid or a suitable mixture which closely encompasses or engages the winding leads 5 and 6 and the power lead contact bolt 21. The conforming to the leads and the bolts is significant in order to minimize contact resistance and arcing as a result of the high density current flow from the contact bolt 21 to the stator leads 5 and 6. In addition to being highly conductive in order to readily conduct the large current flow, the fluid-like material should have a low oxidizing potential and a high melting point such that the original conforming characteristics are retained for a substantial number of pulse transfers or cycles. When the capacitor bank 14 is discharged, a large surge current necessarily flows from the contact bolt 21 through the fluid-like medium or material 25 to the stator leads 5 and 6. Applicant has found that calcined coke which passes a mesh sieve range of from 16 to 32 thousandths provides an extremely satisfying medium for optimum results. The calcinated coke remains in finely powdered form and acts almost like a liquid or a colladial suspension to encompass the flexible leads. It has been found that with the use of calcined coke the medium is generally in the order of a couple of weeks of continuous production.

While calcinated coke is preferred as the material 25, in certain situations, other substances such as mercury, liquid gallium, powdered graphite, a powdered mixture of graphite and copper, aqueous electrolytes, and the like can be used.

In the illustrated embodiment of the invention the coke 25 is slightly spaced from the upper level of the housing which after loading of the coke therein is closed by a top wall 26. A plurality of bolts 27 pass through the top wall 26 and thread into suitably threaded openings in the wall of the outer housing 8. A gasket 28 of neoprene or other suitable material is disposed between the top wall 26 and the upper edge of the housing 18 to provide a reasonably tight joint therebetween.

The top wall 26 includes a generally centrally located lead opening 29, the outer end of which is flared to define a generally cone shaped entrance portion. The opening 29 is sufficiently large to accommodate the pair of leads 5 and 6 of the stator windings 3 and 4 which pass therethrough and project downwardly into the fluid-like medium 25. In accordance with the illustrated embodiment of the present invention, a clamp assembly 30 is bolted or otherwise secured to the top wall of the insulating base member. The clamp unit 30 includes a toggle linkage 31 having an outer vertical rod 32 aligned with the top wall opening 29 of the housing. The lower end of the clamp rod 32 terminates in a cone-shaped insulated tip 33 of rubber or the like adapted to mate with the flare portion of the opening 29. The clamp unit 30 is released to space the cone-shaped tip 33 from the opening to permit introduction and removal of the leads 5 and 6 through the opening. With the leads 5 and 6 disposed within the opening and embedded within the conducting material 25, the clamp unit 30 is closed with the insulating tip 33 disposed in the cone-shaped portion of opening 29 to firmly clamp the leads 5 and 6 in the opening. The insualting tip 33 also serves to close the housing such that the material 25 is not blown out of the housing as a result of the high power surge during energization of the winding.

In operation, the capacitor bank 14 is charged and the insulated leads 5 and 6 are inserted into the conducting medium 25 with the lowermost end exposed as a result of the cut ends of the leads. The top clamp unit 30 is closed to seal the housing 18. The capacitor bank 14 is then discharged through the stator windings 3 and 4 by operating switch unit 15 with the current flowing from the one side of the capacitor bank 14 through the connector assembly 9, the windings 3 and 4, in parallel, and back through the opposite contact assembly 10 to the power source.

The discharge of the current through the windings 3 and 4 generates interacting magnetic fields causing movement of the coils into the slot 2.

The current flow within the connector assemblies is essentially a purely conductive flow between the contact bolt, the fluid-like material and the leads. Initially only the very tip of the insulated leads is exposed and the initial current flow is concentrated at the tip. However, the heat generated removes the insulations and exposes the end portions of the leads.

Although the calcined coke provides a minimum of resistance it has been found that the temperature resulting from the pulsed energization or the pulse current flow is sufficiently great to disrupt or destroy the housing and cause contamination and disruption of the effectiveness of the calcined coke. The inner liner 19 however protects the outer insulating housing 18 against deterioration. Further, protection of the housing or pot 18 may be obtained by providing slots 34 in the wall of housing 18 which may be filled with any suitable liquid cooling medium such as water. The medium may merely be allowed to boil off and the slots are refilled from time to time or the medium may be circulated through the slots by flow from pipes 35 connected to a source of supply not shown.

In an actual construction applicant has employed a bank of seven capacitors each being a 375 microfarad condenser of the 4000 volt oil type variety. The capacitors were connected in parallel and charged to a 2400 volts to provide the necessary energy. The charged capacitors were discharged to a winding formed of the usual thin magnet wire employed in stator construction such as three strands of number 17 copper wire.

The illustrated embodiment includes the special insulated cup construction. However, the cup may be formed of a suitable conducting material with the fluid-like conducting medium disposed therein. The cup would then be connected directly to one side of the capacitor bank and form the conducting contact member.

The present invention has been found to provide a rapidly actuated releasable connector having a long-life in high energy pulse circuits and thus is particularly adapted to mass production such as required for commercial application in a stator fabricating line.

Various modes of carrying out the invention are contemplated as being within the scope of the following claims particularly pointing out and distinctly claiming the subject matter which is regarded as the invention.

I claim:

1. A releasable connector for releasably connecting small flexible lead means to a high voltage power source for passing a high energy pulse through said lead means, comprising a pulse-confining housing having an inner terminal and an opening positioned to freely receive said lead means in spaced relation to said terminal, a finely divided solid conductive material loosely confined within said housing to allow free insertion and removal of the lead into said solid conductive material, said solid conductive material conforming about the inserted lead and essentially providing multiple continuous paths between the terminal and the inserted lead, said conductive material having a melting temperature in excess of the temperature created by the high energy pulse and being essentially non-oxidizing at such temperature, and closure means adapted to seal the lead means at the opening.

2. The releasable connector of claim 1 wherein said solid conductive material is selected from the group of calcined coke, graphite, carbon and mixtures thereof.

3. The releasable connector of claim 1 wherein said conductive material essentially falls within the range from a 16 mesh sieve to 32 mesh sieve.

4. The releasable connector of claim 1 wherein said conductive material is calcined coke within the range essentially from a 16 mesh sieve to 32 mesh sieve.

5. The releasable connector of claim 1 in combination with such a lead covered with insulation to its end and juxtaposed adjacent said terminal for removal of said insulation by heat from the initial energy pulse.

References Cited

UNITED STATES PATENTS

| 2,072,850 | 3/1937 | Andre | 338—223 X |
| 2,935,722 | 5/1960 | Kacin | 339—118 |
| 3,158,420 | 11/1964 | Olson et al. | 339—111 X |
| 3,286,181 | 11/1966 | Dudash et al. | 339—93 X |

FOREIGN PATENTS

| 555,645 | 3/1923 | France. |

OTHER REFERENCES

IBM Technical Disclosure Bulletin, article entitled "Solderless Electrical Contacts," by L. F. Miller and A.H. Mones, vol. 7, No. 1, June 1964, pp. 101,102, 339–118.

RICHARD E. MOORE, *Primary Examiner.*

UNITED STATES PATENT OFFICE
CERTIFICATE OF CORRECTION

Patent No. 3,395,383    July 30, 1968

John E. Jordan

It is certified that error appears in the above identified patent and that said Letters Patent are hereby corrected as shown below:

Column 1, line 15, after "cup-shaped" insert -- liner --. Column 2, line 69, "tank" should read -- bank --. Column 3, line 22, "tradename" should read -- trademark --. Column 6, line 13, after "initial" insert -- high --.

Signed and sealed this 3rd day of February 1970.

(SEAL)

Attest:

Edward M. Fletcher, Jr.

Attesting Officer

WILLIAM E. SCHUYLER, JR.

Commissioner of Patents